(12) United States Patent
Stehager

(10) Patent No.: US 6,382,788 B1
(45) Date of Patent: May 7, 2002

(54) EYEGLASSES WITH MODIFIED LIGHT TRANSMISSION

(76) Inventor: Torbjörn V. Stehager, Dagsverksvägen 21 Lugnet 1, Ingarö (SE), SE-134 65

(*) Notice: Subject to any disclaimer, the term of this patent is extended or adjusted under 35 U.S.C. 154(b) by 0 days.

(21) Appl. No.: 09/701,563
(22) PCT Filed: May 31, 1999
(86) PCT No.: PCT/SE99/00938
  § 371 Date: Dec. 5, 2000
  § 102(e) Date: Dec. 5, 2000
(87) PCT Pub. No.: WO99/67677
  PCT Pub. Date: Dec. 29, 1999

(30) Foreign Application Priority Data

Jun. 5, 1998 (SE) .................................. 9802009

(51) Int. Cl.$^7$ .................................................. G02C 7/10
(52) U.S. Cl. .......................................... 351/163; 351/44
(58) Field of Search .............................. 351/163, 164, 351/165, 44

(56) References Cited

U.S. PATENT DOCUMENTS

| | | | | |
|---|---|---|---|---|
| 5,157,426 A | * | 10/1992 | Kronberg | 351/163 |
| 5,975,695 A | * | 11/1999 | Baiocchi et al. | 351/163 |

* cited by examiner

*Primary Examiner*—Scott J. Sugarman
(74) *Attorney, Agent, or Firm*—Jacobson Holman, PLLC

(57) ABSTRACT

Eyeglasses which function to make contours and light coloured objects to stand out more clearly in a range of vision or field of view that is dominated by green vegetation, wherein the lenses of said eyeglasses have a light transmission which varies with the wavelength of the light. The transmission essentially follows a straight line $T = K \lambda - t$, where K is the gradient of the line and is from $0.13 \pm 0.03$, $\lambda$ is the wavelength in nm, t lies in the range of 5–30% units and T denotes the transmission in %-units, wherein the transmission follows the straight line T when $\lambda$ is >620 nm. Transmission beneath 620 nm follows a curve that intersects the line T roughly at 400 and 500 nm and the curve takes a maximum which lies 5–30 % units above T at 450 nm and 5–30% units beneath T at 550 nm. The lens also has a horizontal polarisation filter facility.

2 Claims, 1 Drawing Sheet

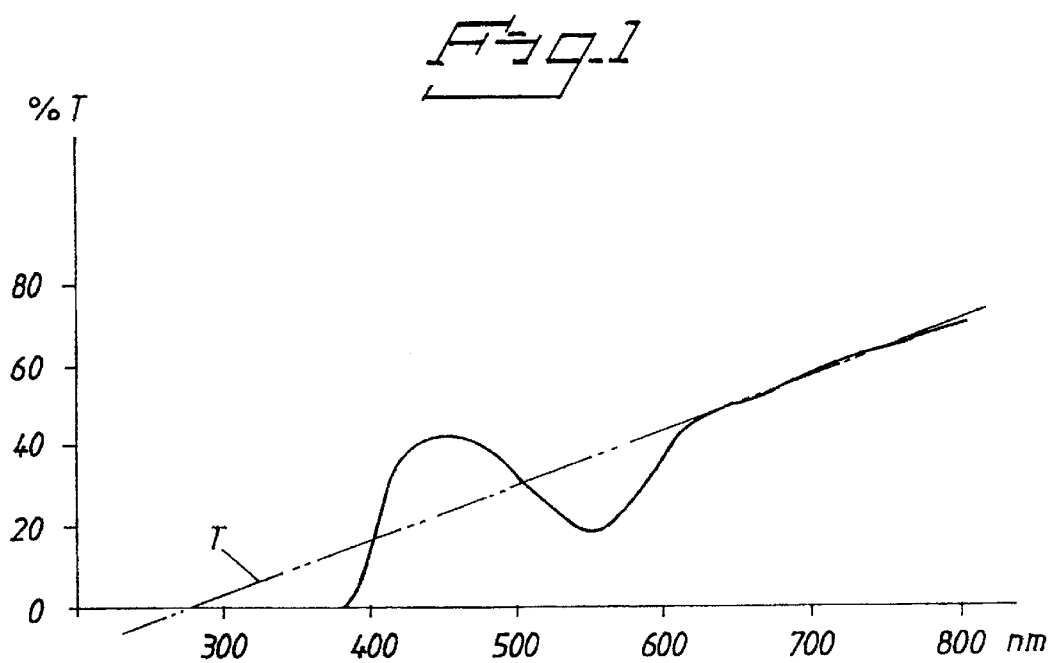
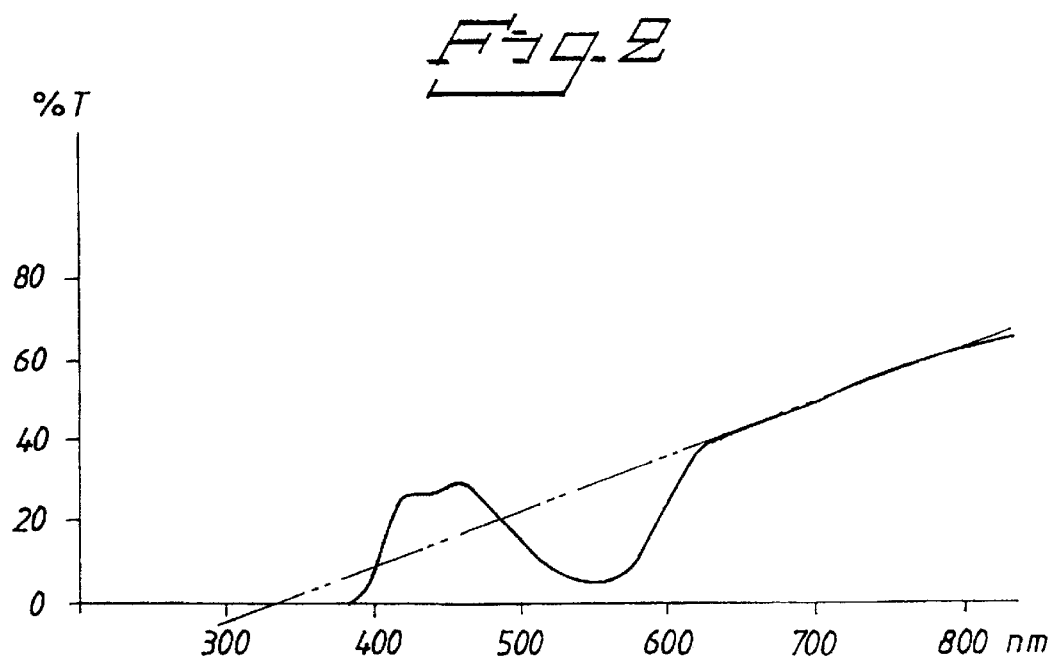

EYEGLASSES WITH MODIFIED LIGHT TRANSMISSION

The present invention relates to eyeglasses of the kind defined in the preamble of claim 1.

Thus, the invention relates to eyeglasses that function to make contours stand out more clearly and distinctly to the wearer and to enable the wearer to discern light-coloured objects more easily, in a range of vision that is dominated predominantly by green coloured vegetation, said eyeglasses having a light transmission that varies with the wavelength of said light.

The inventive eyeglasses are particularly intended to enable a golfer to discern the contour curvature and slope of grass-covered ground sharply and clearly, and also to enable a golf ball lying in grass, rough vegetation and other places to be discovered more easily.

It is well known, for instance from U.S. Pat. No. 5,157,426, that certain informatory details in an environment dominated by green vegetation can be identified more easily when wearing eyeglasses that have significantly reduced light transmission over essentially the whole of the sequence band discerned by the human eye, with the exception of the infrared range (wavelengths longer than 700 nm) and to a limited extent in the blue/green and blue/violet ranges (500–520 nm and shorter than 435 nm respectively).

DE-A1-31 13 833 teaches eyeglass lenses having light transmission in a narow range near the infrared limit only.

DE-A1-35 34 575 teaches eyeglass lenses for colour contrast amplification with reduced transmission in respect of wavelengths above 720 nm and in respective wavelengths that lie between 550 and 600 nm.

Although these known devices provide some advantages with respect to facilitating identification of certain elements in a green environment, none of said devices provides a fully satisfactory solution to the difficulties experienced by golfers in particular when they shall strike a golf ball or identify a golf course contour.

Accordingly, an object of the invention is to provide eyeglasses that will enable, for instance, a golfer to identify contours and light-coloured objects such as a golf ball more easily in a range of vision or field of view that is dominated by green vegetation.

This object is achieved with eyeglasses constructed in accordance with the accompanying claim 1.

Further embodiments of the invention are set forth in the accompanying dependent claim.

Fundamentally, the invention can be considered to lie in the lens having a special frequency-dependent transmission, and in the lens also including a horizontal polarisation filter. A particularly favourable embodiment of the invention can be achieved by combining a commercially available colour compensation filter, Kodak Wratten filter, Magenta CC 40 M, with a commercially available horizontal polarisation filter, Polaroid HN 32. A common feature of these filters is that they both have a transmission curve according to claim 1, with t=−20% -units and curve deviations of 20% -units from the straight line T at 450 and 550 nm respectively.

According to a further development of the invention, two such Kodak Wratten filters can be combined with a Polaroid HN 32 filter.

The invention will now be described by way or example with reference to the accompanying drawing, in which FIG. 1 is a graph illustrating the wavelength-dependent transmission of an inventive eyeglass lens according to a first embodiment; and FIG. 2 is a graph illustrating the transmission of a lens according to another embodiment.

FIG. 1 illustrates a transmission curve for a lens of inventive eyeglasses.

The inventive lens also has horizontal polarisation. It will be seen that the transmission curve can be approximated by a straight line T, wherewith the transmission follows the line T at frequencies >620 nm, and that the line T has a gradient k=0.13 and intersects the abscissa at 380 nm. It will also be seen that the curve falls steeply towards 0 (zero) at wavelength 400 nm and intersects the line T at 400 and 500 nm and lies on the line T at 600 nm. Deviation of the curve from the line T is 20% units above T at 450 nm and 20% units beneath T at 500 nm. It will be seen that the transmission is about 80% at 800 nm.

FIG. 2 shows a transmission curve where the straight line T has a gradient of 0.13 and intersects the abscissa at roughly 330 nm, and that the transmission is about 62% at 800 nm. The transmission falls steeply towards 0 (zero) at 400 nm. The transmission curve intersects the line T at 400 nm and in the region of 500 nm and lies on the line T at 620 nm and follows the line T at greater wavelengths. In the case of the FIG. 2 embodiment, the curve lies at a maximum of 15% units above the line T at roughly 450 nm and the curve minimum lies at 20% units beneath the line T at roughly 550 nm.

It will be obvious to the person skilled in this art that the transmission curve can be displaced upwardly and downwardly to some extent in both of the graphs shown, without detracting from the inventive effect. It will also be understood by the skilled person that the slope of line T can be changed within certain limits and that the curves may be displaced horizontally within certain limits without losing the favourable inventive effect.

The eyeglass lens shall have a horizontal polarisation in both of the embodiments shown in FIGS. 1 and 2.

In the case of commercial polarisation filters, these filters have a certain wavelength-dependent transmission modifying effect in addition to said polarisation effect.

FIG. 1 shows the resultant transmission for Kodak Wratten filter No. 40, Magenta CC 40 M, together with a polarisation filter Polaroid HN 32.

FIG. 2 illustrates the resultant combined transmission for an inventive eyeglass lens that includes two such Kodak Wratten filters and one such Polaroid filter.

It will be evident from FIGS. 1 and 2 that the light transmission follows a generally sinusoidal curve that has a period of about 200 nm from 400 nm to 600 nm relative to the straight line T.

What is claimed is:

1. Eyeglasses for enabling contours and light-coloured objects to stand out more clearly and more distinctly in a range of vision or field of view that is dominated by green vegetation, wherein the eyeglasses include lenses whose light transmission varies with the wavelength of the light, characterised in that said transmission essentially follows a straight line T=K $\lambda$−t, where K is the gradient of the line and is from 0.13±0.03, $\lambda$ is the wavelength in nm, t lies in the range of 5–30% units and T denotes the transmission in %-units, wherein the transmission follows the straight line T when $\lambda$ is >620 nm; in that transmission beneath 620 nm follows a curve that intersects the line T roughly at 400 and 500 nm; in that the curve has a maximum which lies 5–30% units above T at 450 nm and 5–30% units beneath T at 550 nm; and in that the lens also has a horizontal polarisation filter facility.

2. Eyeglasses according to claim 1, characterised in that the transmission is negligibly low at frequencies beneath about 180 nm.

* * * * *